United States Patent
Monroe et al.

(10) Patent No.: US 6,735,971 B2
(45) Date of Patent: May 18, 2004

(54) FOOD SERVING BAR

(75) Inventors: Darly R. Monroe, Granite City, IL (US); Kim C. Fietsam, New Athens, IL (US); Paul S. Rusk, Ballwin, MO (US)

(73) Assignee: Duke Manufacturing Company, St. Louis, MO (US)

( * ) Notice: Subject to any disclaimer, the term of this patent is extended or adjusted under 35 U.S.C. 154(b) by 0 days.

(21) Appl. No.: 10/266,428

(22) Filed: Oct. 8, 2002

(65) Prior Publication Data
US 2004/0065103 A1 Apr. 8, 2004

(51) Int. Cl.[7] ............................................... F25D 23/12
(52) U.S. Cl. ........................................... 62/258; 62/446
(58) Field of Search .......................... 62/258, 382, 443, 62/446; 165/168

(56) References Cited

U.S. PATENT DOCUMENTS

| | | |
|---|---|---|
| 1,831,861 A | 11/1931 | Henney |
| 1,912,577 A | 6/1933 | Glass |
| 2,305,319 A | 12/1942 | Pirnie |
| 2,360,074 A | 10/1944 | Robison |
| 2,607,204 A | 8/1952 | Kleist |
| 2,693,089 A | 11/1954 | Teeter |
| 2,797,560 A | 7/1957 | Kooiker et al. |
| 2,890,863 A | 6/1959 | Scal |
| 2,893,805 A | 7/1959 | Ferguson |
| 3,308,633 A | 3/1967 | Kritzer, Jr. |
| 3,388,561 A | 6/1968 | Parrott |
| 3,491,548 A | 1/1970 | Christiansen |
| 3,780,794 A | 12/1973 | Staub |
| 3,832,862 A | 9/1974 | Ingels |
| 3,952,794 A | 4/1976 | Spanoudis |
| 3,971,231 A | 7/1976 | Derry |
| 4,210,675 A | 7/1980 | Liebermann |
| 4,213,498 A | 7/1980 | Vandenbossche |
| 4,407,143 A | 10/1983 | Wolfe |
| 4,593,752 A | 6/1986 | Tipton |

(List continued on next page.)

FOREIGN PATENT DOCUMENTS

| | | |
|---|---|---|
| GB | 973994 | 11/1964 |
| GB | 2152648 | 8/1985 |

OTHER PUBLICATIONS

Kairak Innovations, Exhibit A—Pan Chiller System, drawn Feb. 7, 1994, submitted to Patent Office Mar. 9, 1994 during prosecution of U.S. patent No. 5,355,687.

(List continued on next page.)

Primary Examiner—William E. Tapolcai
(74) Attorney, Agent, or Firm—Senniger, Powers, Leavitt & Roedel (57) ABSTRACT

A temperature controlled food serving bar. The food serving bar includes a cabinet having a bottom, opposite sides and opposite ends defining an interior-space. A top wall and an opening in the top wall are above the interior space. A plurality of elongate, generally parallel spaced apart dividers of thermally conductive material extend lengthwise of the cabinet in or below the opening. The dividers have side walls dividing the interior space into elongate generally parallel cavities. A temperature control system for controlling the temperature of the dividers has heat transfer lines extending along the side walls of the dividers. Upwardly facing surfaces on the dividers support food-holding pans such that the pans extend down into the cavities adjacent the side walls. Thermal barriers below the upwardly facing surfaces inhibit the transfer of heat between the side walls and the upwardly facing surfaces.

45 Claims, 11 Drawing Sheets

U.S. PATENT DOCUMENTS

| | | | |
|---|---|---|---|
| 4,615,183 A | 10/1986 | Juncos et al. |
| 4,782,665 A | 11/1988 | Wolfe |
| 4,802,340 A | 2/1989 | Johnson |
| 4,852,741 A | 8/1989 | Van Benschoten |
| 4,856,579 A | 8/1989 | Wolfe |
| 4,870,835 A | 10/1989 | Wolfe et al. |
| 5,010,741 A | 4/1991 | Gelatini |
| 5,117,649 A | 6/1992 | Mangini et al. |
| 5,168,719 A | 12/1992 | Branz et al. |
| 5,247,807 A | 9/1993 | Jarman et al. |
| 5,355,687 A | 10/1994 | Carpenter et al. |
| 5,363,672 A | 11/1994 | Moore et al. |
| 5,404,935 A | 4/1995 | Liebermann |
| 5,551,774 A | 9/1996 | Campbell et al. |
| 5,927,092 A | 7/1999 | Kushen et al. |
| 6,000,236 A | 12/1999 | Haasis |
| 6,085,535 A | 7/2000 | Richmond et al. |
| 6,145,333 A | 11/2000 | Richmond et al. |
| 6,151,905 A | 11/2000 | Smith |
| 6,202,432 B1 | 3/2001 | Haasis |
| 6,434,961 B2 | 8/2002 | Richmond et al. |

OTHER PUBLICATIONS

Kairak Innovations, Declaration of Jeff Hatch including Exhibit A–A—Pan Chiller System, Declaration signed May 27, 1994, Exhibit A–A drawn May 23, 1994, submitted to Patent Office Jun. 2, 1994 during prosecution of U.S. patent No. 5,355,687.

FOOD SERVING BAR

BACKGROUND OF THE INVENTION

The present invention relates generally to the food service industry, and more particularly to food serving bars which are temperature controlled to maintain food at a suitable temperature as it is being served.

This invention is generally in the same field as U.S. Pat. Nos. 4,407,143, 4,782,665, 4,856,579 and 4,870,835, owned by Duke Manufacturing Company, disclosing refrigerated food serving equipment known as frost top units which give the appearance that the food products being served are resting in ice. U.S. Pat. Nos. 5,355,687 and 5,927,092 disclose other types of refrigerated units for holding food pans.

SUMMARY OF THE INVENTION

Among the several objects of this invention will be noted the provision of a food serving bar which is equipped for holding a number of relatively small (e.g., 6.9 in. wide by 12.8 in. long) food pans in parallel rows; the provision of such a serving bar which efficiently cools and/or heats the food in all such pans substantially uniformly; the provision of such a serving bar which is economical to manufacture and attractive in appearance; and the provision of such a serving bar which can easily retrofit a conventional frost top unit.

In general, a temperature controlled food serving bar of this invention comprises a cabinet having a bottom, opposite sides and opposite ends defining an interior space. A top wall overlies the base and has an opening therein above the interior space. A plurality of elongate, generally parallel, spaced apart dividers of thermally conductive material extend lengthwise of the cabinet in or below the opening. The dividers have side walls extending down into the interior space of the cabinet dividing the interior space into a plurality of elongate generally parallel cavities extending lengthwise of the cabinet. A temperature control system having a plurality of heat transfer lines extending along the side walls of the dividers at locations outside the cavities controls the temperature of the side walls. Upwardly facing surfaces on the dividers support food-holding pans in positions in which the pans extend down into the cavities adjacent the side walls of the dividers for being heated or cooled thereby. Thermal barriers are provided below the upwardly facing surfaces to inhibit the transfer of heat between the dividers and the upward facing surfaces.

The present invention is also direct to a temperature controlled food serving bar having at least two, generally parallel, spaced apart channels of thermally conductive material. The channels extend lengthwise of the cabinet in or below the opening. Each channel has a bottom wall and opposing side walls defining an elongate cavity extending lengthwise of the cabinet. The temperature control system comprises a plurality of heat transfer lines extending along the side walls of the channels at locations outside the cavities. Upwardly facing surfaces on the channels support food-holding pans in positions in which the pans extend down into the cavities adjacent the side walls of the channels for being heated or cooled thereby.

Other objects and features will be in part apparent and in part pointed out hereinafter.

BRIEF DESCRIPTION OF THE DRAWINGS

Corresponding parts are designated by corresponding reference numbers throughout the drawings.

DESCRIPTION OF PREFERRED EMBODIMENTS

Figure 1:
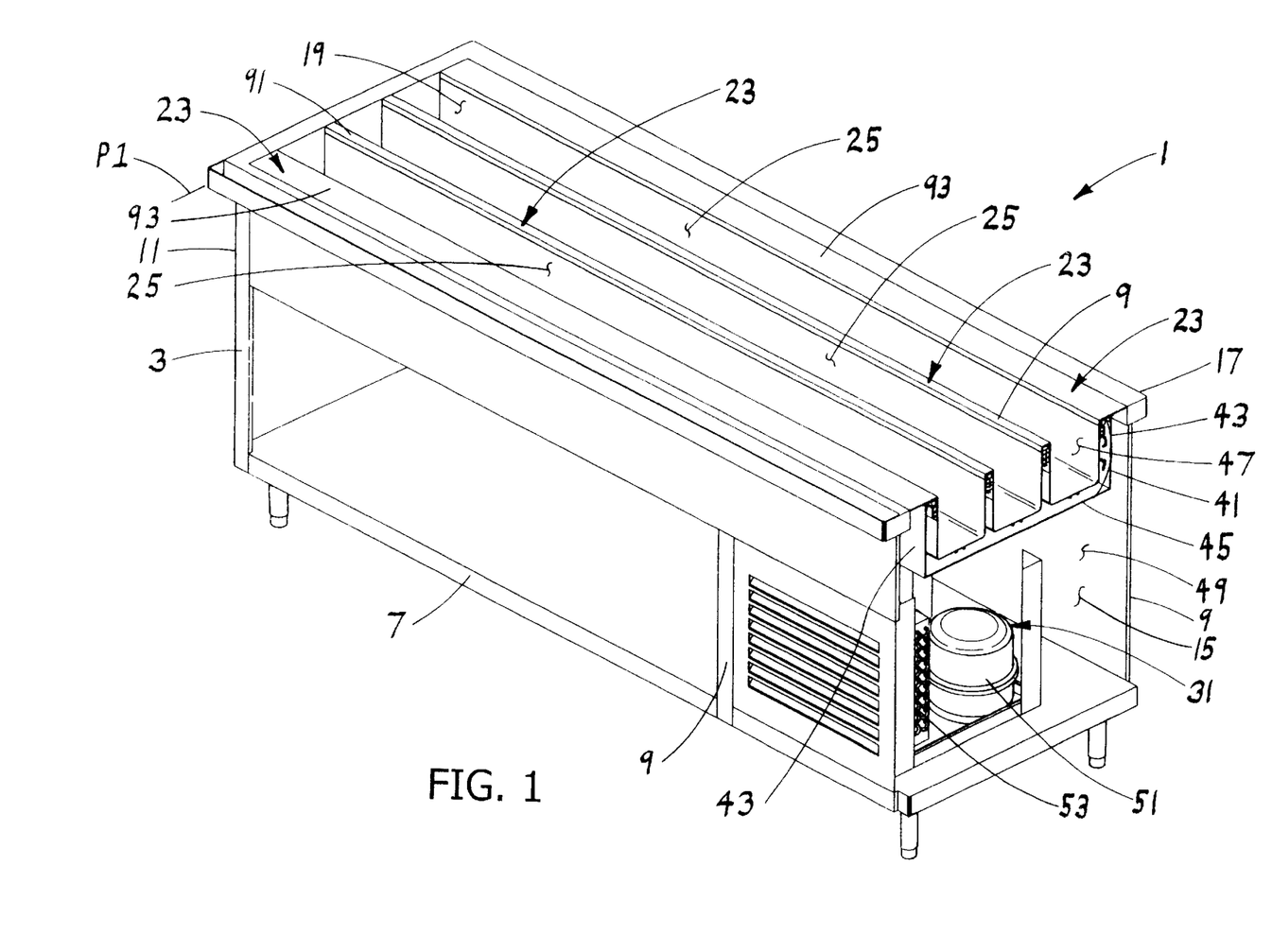
FIG. 1 is a perspective of a first embodiment of a food serving bar of the present invention.

Referring to the drawings, and first and more particularly to FIG. 1, a food serving bar of the present invention is designated in its entirety by the reference numeral 1. The bar 1 comprises a base 3 in the form of a cabinet having a bottom wall 7, side walls 9 and end walls 11 defining an interior space 15. A top wall 17 overlies the interior space 15 and has an opening 19 therein, preferably but not necessarily elongate, above the interior space. In the illustrated embodiment of FIG. 1, one of the end walls 11 and a portion of one of the side walls 9 have been removed to more clearly illustrate the interior space 15. A plurality of elongate generally parallel dividers, each generally designated 23, of thermally conductive material (e.g., extruded aluminum) extend lengthwise of the cabinet 3 in the interior space 15 below the opening 19 in the top wall 17. The dividers 23 define a plurality of elongate generally parallel pan-receiving cavities 25 for receiving generally parallel rows of food-holding pans 27 extending lengthwise of the base 3 in the interior space 15, one such pan being shown in FIG. 2. The bar 1 also includes a temperature control system 31 comprising, in the preferred embodiment, a plurality of heat transfer lines 33 for heating or cooling the dividers 23 and the pans 27 received in the cavities 25, as will be described in more detail hereinafter. In the embodiments described below, the temperature control system 31 is a refrigeration system for cooling the dividers 23 and pans 27, but it will be understood that the temperature control system could also be operable to heat the dividers and pans.

Referring to FIGS. 1–5, the food serving bar 1 includes a pan-shaped liner 41 fabricated of sheet metal, for example, suitably secured (e.g., welded) to the top wall 17 of the cabinet 3. The liner 41 has side walls 43 extending down from the top wall 17 and a bottom wall 45 spaced below the opening 19 in the top wall 17 and below the dividers 23. The liner 41 divides the interior space 15 of the cabinet 3 into an upper section 47 inside the liner and a lower section 49 below the liner. A compressor 51 and evaporator 53 of the aforementioned refrigeration system 31 are located in the lower section 49 for cooling the lower part of the cabinet 3 in conventional fashion. The refrigeration lines 33 for cooling the dividers 23 are connected to the compressor 51 by quick-connect/disconnect mechanisms, soldering or other suitable means (not shown).

In the embodiment shown in FIGS. 1–5, each divider 23 comprises a channel 61 having a bottom wall 63 and side walls 65 extending up from the bottom wall to define one of the pan-receiving cavities 25. Three such channels 61 are shown, but this number can vary (e.g., two, four or more than four). The channels 61 can be fabricated of stamped sheet metal, or extruded or cast of thermally conductive material (e.g., aluminum or stainless steel). Further, each channel 61 can be an assembly of such parts, or a single extrusion or casting. The channels 61 can be formed separate from one another, or as a unitary structure. In a preferred embodiment, each channel 61 is of extruded aluminum having a wall thickness in the range of from about 0.1 in. to about 0.2 in. The parallel channels 61 are spaced apart a suitable distance (e.g., 1.1 in.) to form inner substantially vertical interior spaces 67 between adjacent side walls 65 of adjacent channels. Further, the sides 43 of the liner 41 are spaced from the outer side walls 65 of the two outside channels 61 to form outer substantially vertical interior spaces 71. The liner 41 is spaced below the bottom walls 63 of the channels 61 to define a generally horizontal interior space indicated at 73.

Figure 2:
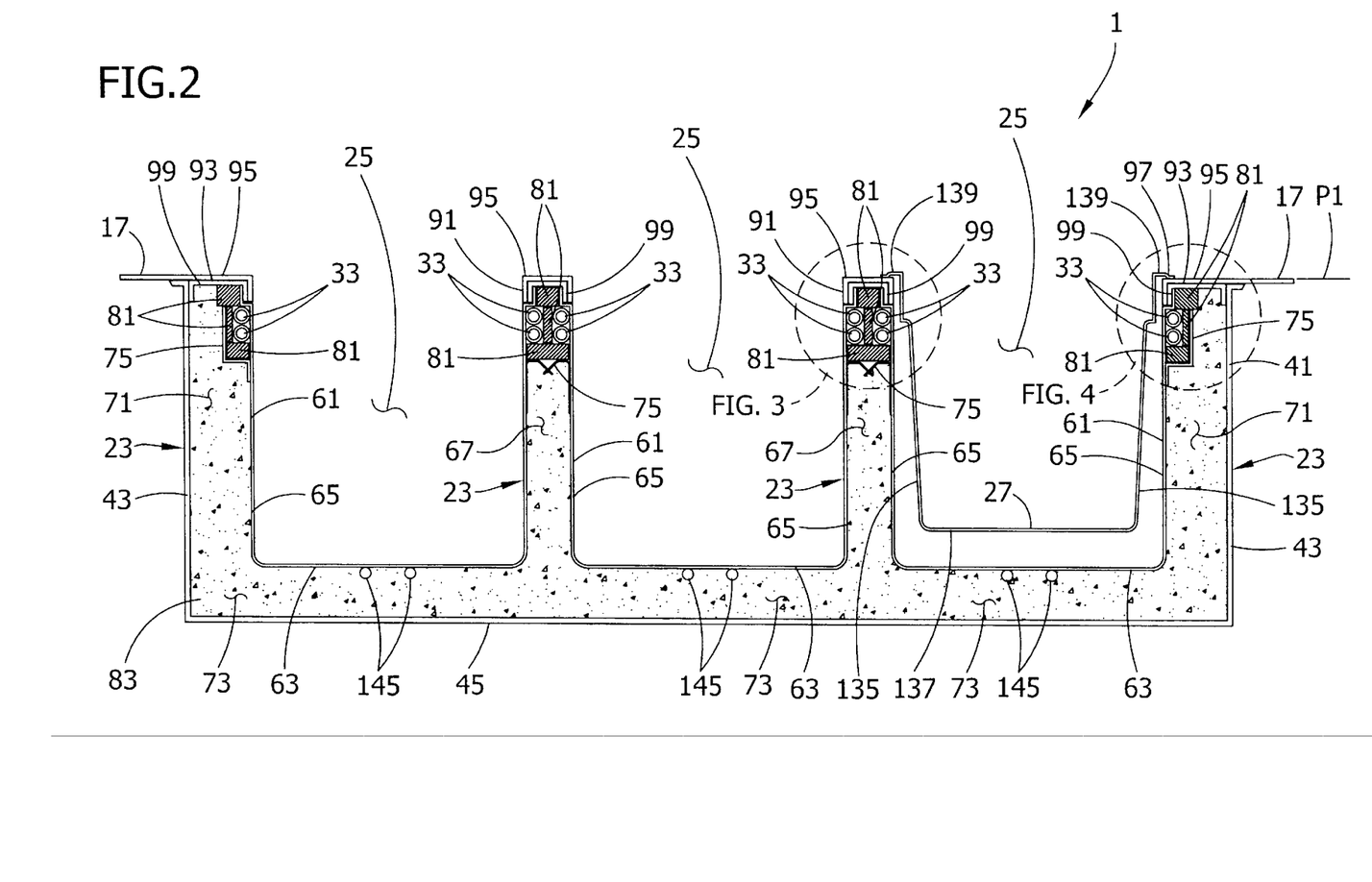
FIG. 2 is a sectional view showing a plurality of dividers and cavities in the food serving bar, and a food pan in one of the cavities.
Figure 3:
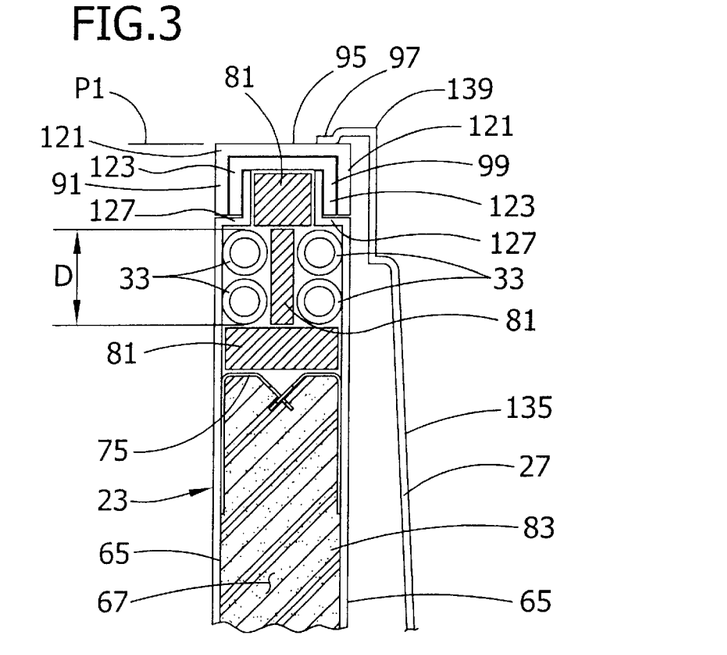
FIG. 3 is an enlarged portion of FIG. 2 showing an inner substantially vertical interior space of the food serving bar.
Figure 4:
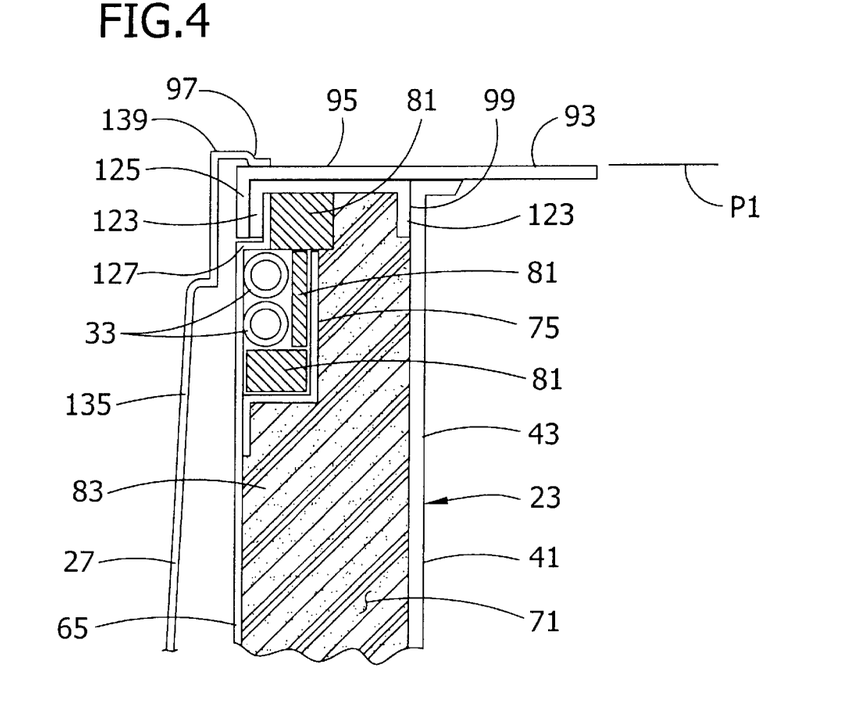
FIG. 4 is an enlarged portion of FIG. 2 showing an outer substantially vertical interior space of the food serving bar.
Figure 5:
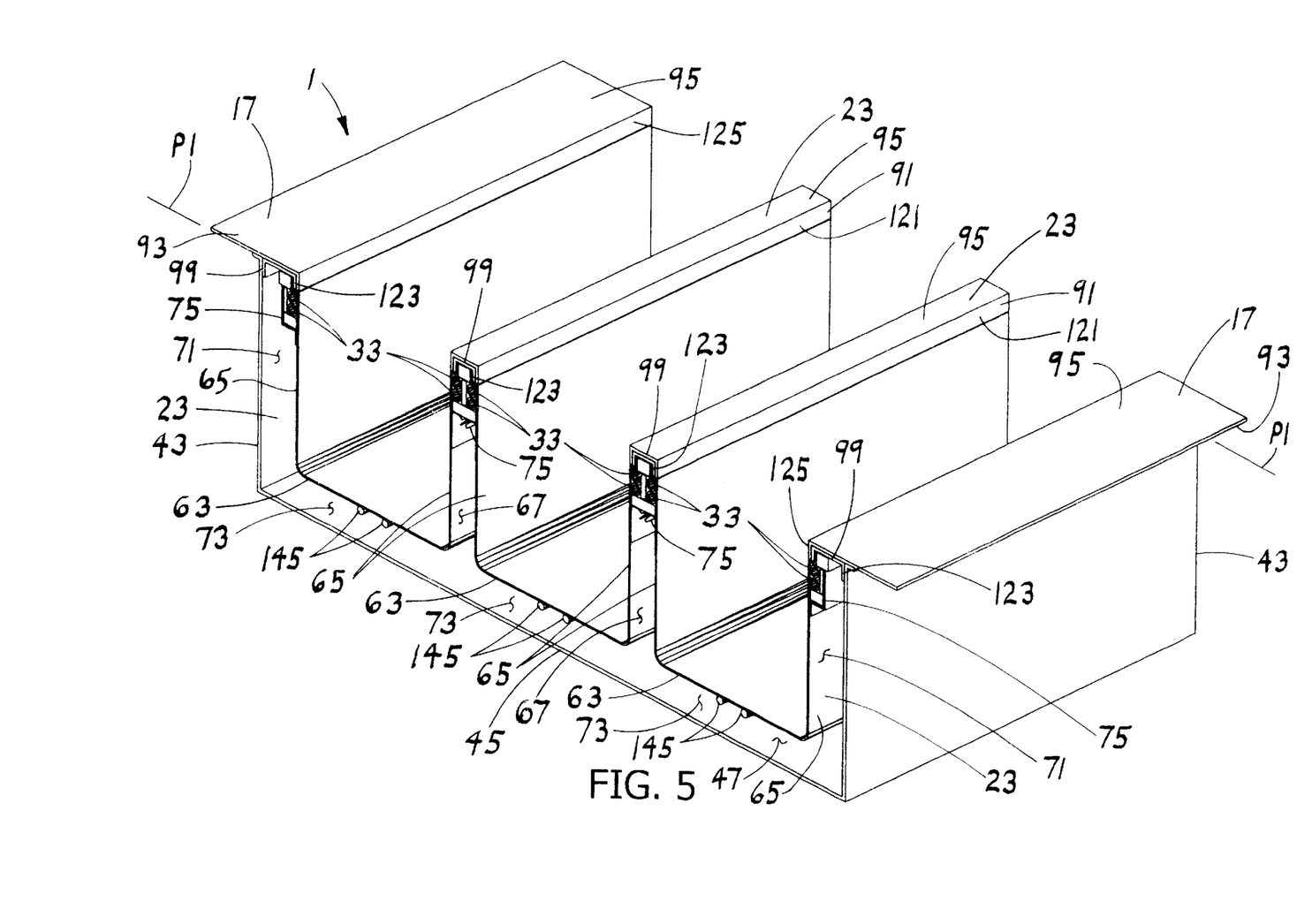
FIG. 5 is a detail cut-away of a portion of the food serving bar of FIG. 1.

The heat transfer lines 33 are located in the inner and outer vertical spaces, 67 and 71 respectively, alongside the side walls 65 of the channels 61, preferably adjacent the upper ends of the side walls for cooling (or heating) the upper side portions of the pans 27 disposed in the channels. The heat transfer lines 33 may comprise lengths of copper tubing running the lengths of the channels 61 for carrying a suitable heat transfer medium (e.g., coolant). To insure good heat transfer between the lines 33 and the channel walls 65, the lines are preferably secured so that they are in direct contact with the walls, as by brackets 75 attached (e.g., welded) to the walls 65 at suitable intervals along the walls. The required size and configuration of lines 33 will depend on the size of the pans 27, the desired temperature at which the food in the pans is to be maintained, the amount and type of food being maintained, and other factors apparent to those skilled in this field. As shown in FIG. 2, two runs of lines 33 (upper and lower) are provided along the upper portion of each side wall 65 of each channel 61, the runs being stacked relatively closely one above the other. In the illustrated embodiment of FIGS. 1–5, the heat transfer lines 33 are substantially parallel with the channels 61 extending the length of the food bar 1 thus eliminating the need for heat transfer lines that extend transversely across the channels 61 at locations between adjacent pans 27 in the cavities 25. By way of example, but not limitation, the lines 33 may be ⅜ in. OD copper tubing, with the centers of the runs being spaced about 0.6 in. apart, and the overall vertical distance D (FIG. 3) being about 1.0 in. It will be understood that more or less than two lines 33 can be used to cool or heat each wall 65 (which is thus referred to as a temperature controlled wall). The lines 33 may be formed as a single serpentine coil, as shown in FIGS. 1–5, or as a number (e.g., three) of separate coils connected together. In any event, the interior spaces 67 and 71 between the liner 41 and the channels 61 are preferably substantially filled with thermal insulation. As shown in FIG. 2, this insulation comprises, in one embodiment, strips of thermal insulation 81 surrounding the heat transfer lines 33 on all sides except the sides immediately adjacent the heat transfer walls 65 of the channels 61. A foam-type insulation 83 fills the vertical spaces 67 and 71 not occupied by the strips 81 as well as the horizontal interior space 73 between the channels 61 and the liner 41. The strips of insulation 81 may be polystyrene, for example, and the foam type insulation 83 may be polyurethane. Other types of insulation may be used to maximize the efficiency of heat transfer between the lines 33 and the channels 61.

In the embodiment of FIGS. 1–5, the side walls 65 of adjacent channels 61 are bridged by caps 91 of a wear resistant material (e.g., stainless steel) overlying the inner substantially vertical interior spaces 67 between the channels. The caps 91 may be secured in place by tack welding, adhesive or other suitable means. Preferably, the caps 91 are removable so that they can be replaced if damaged or as they become worn. Extensions 93 of the top wall 17 of the cabinet 3 overlie the outer substantially vertical interior spaces 71 between the liner 41 and the outer two channels 61 along opposite sides of the opening 19. These caps 91 and extensions 93 have upward facing surfaces 95 which lie substantially in the plane P1 of the top wall 17 of the cabinet 3 and support the peripheral lips 97 of the food-holding pans 27 to support the pans in respective cavities 25, one such pan being shown in FIG. 2. Thermal barriers 99 are provided below the caps 91 and the top wall extensions 93 to prevent frosting (or overheating) of these areas. The thermal barriers 99 may be of a suitable heat insulating material, such as polycarbonate. The caps 91, thermal barriers 99 and top wall extensions 93 have vertical flanges, 121, 123 and 125 respectively, which mate against horizontal shoulders 127 formed in the upper ends of the side walls 65 of the channels 61 to form relatively smooth flat continuous junctions between the channel side walls and the caps and between the channel side walls and the top wall extensions to facilitate maintenance and to provide a clean attractive appearance (see FIGS. 3 and 4). In one embodiment, the top heat transfer line 33 along each channel side wall 65 is positioned closely adjacent (preferably touching) a respective horizontal shoulder 127.

Referring to FIG. 2, each channel 61 preferably has a width between the side walls 65 not substantially greater than the width of a pan 27 received in the cavity 25 defined by the channel, so that the sides 135 of the pan are spaced relatively close (e.g., in range of from about 0.03 to 0.15 in.) to the temperature-controlled side walls of the channel. This will insure good heat transfer between the channel 61 and the pan 27. Typically, the sides 135 of the pan 27 are tapered, with the bottom 137 of the pan being somewhat narrower than the top 139 of the pan. Thus, when the pan 27 is positioned in a channel 61, as shown in FIG. 2, the top 139 of the pan will be closest to the substantially vertical side walls 65 of the channel where the heat transfer lines 33 are located for efficient cooling (or heating) of the pans. Preferably, the depth of the channels 61 should be such that there is about 0.5 in. between the bottom wall 63 of the channel and the bottoms 137 of the pans 27. A relatively small spacing is advantageous to maintain in that a smaller cavity between the channels 61 and the pans 27 can be cooled (or heated) more efficiently. The length of the channels 61 will vary, depending on the dimensions of the opening 19 in the top wall 17 of the cabinet 3, but typically will be in the range of from about 54 in. to about 82 in.

While the heat transfer lines 33 described above are preferably standard copper tubing, it is contemplated that other types of thermal fluid lines may be used. For example, aluminum microchannel extrusions of the type commercially available from Thermalex, Inc. of Montgomery, Ala. may also be suitable. Further, the channel walls 65 can be heated or cooled by other mechanisms, such as by a forced air system in which temperature controlled air is circulated between the channels to heat or cool them, or an air impingement system of the type developed by Enersyst Development Center in which jets of high pressure, high velocity, temperature controlled air are directed onto the walls of the channels. The use of a bath system in which the channels 61 are immersed in a thermal fluid is also contemplated.

To prevent over-cooling of the pans and their contents in a situation where the food serving bar is refrigerated, heating elements 145 may be provided along the bottom wall 63 of each channel 61, as shown in FIG. 2. The heating elements 145 may be electric resistance heating elements, for example. Temperature sensors (not shown) may be used to sense the temperatures of the pans 27 and/or channels 61, and to signal the operation of the appropriate heating elements 145 if and when needed.

Figure 6:
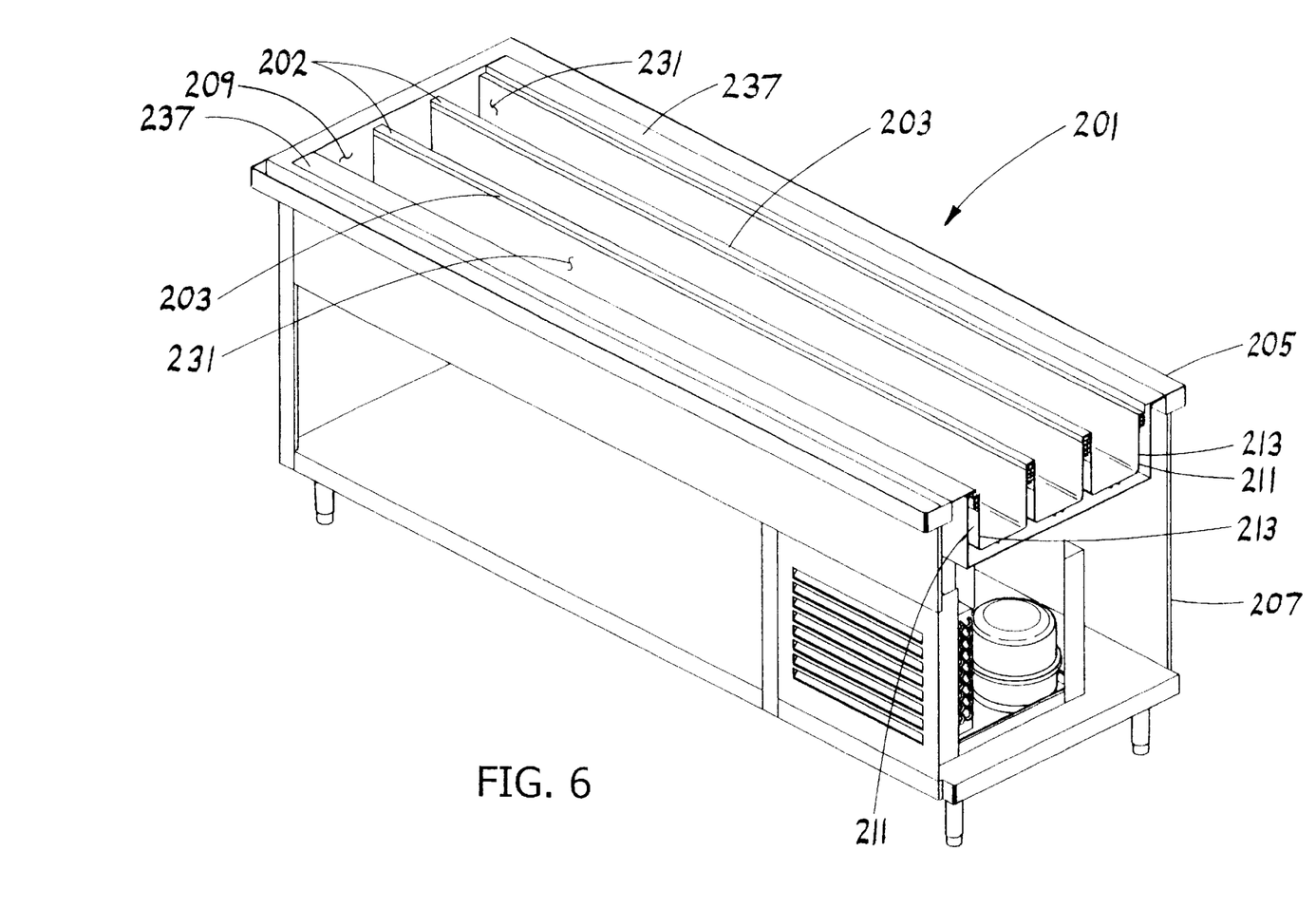
FIG. 6 is a perspective of a second embodiment of a food serving bar of the present invention.
Figure 7:
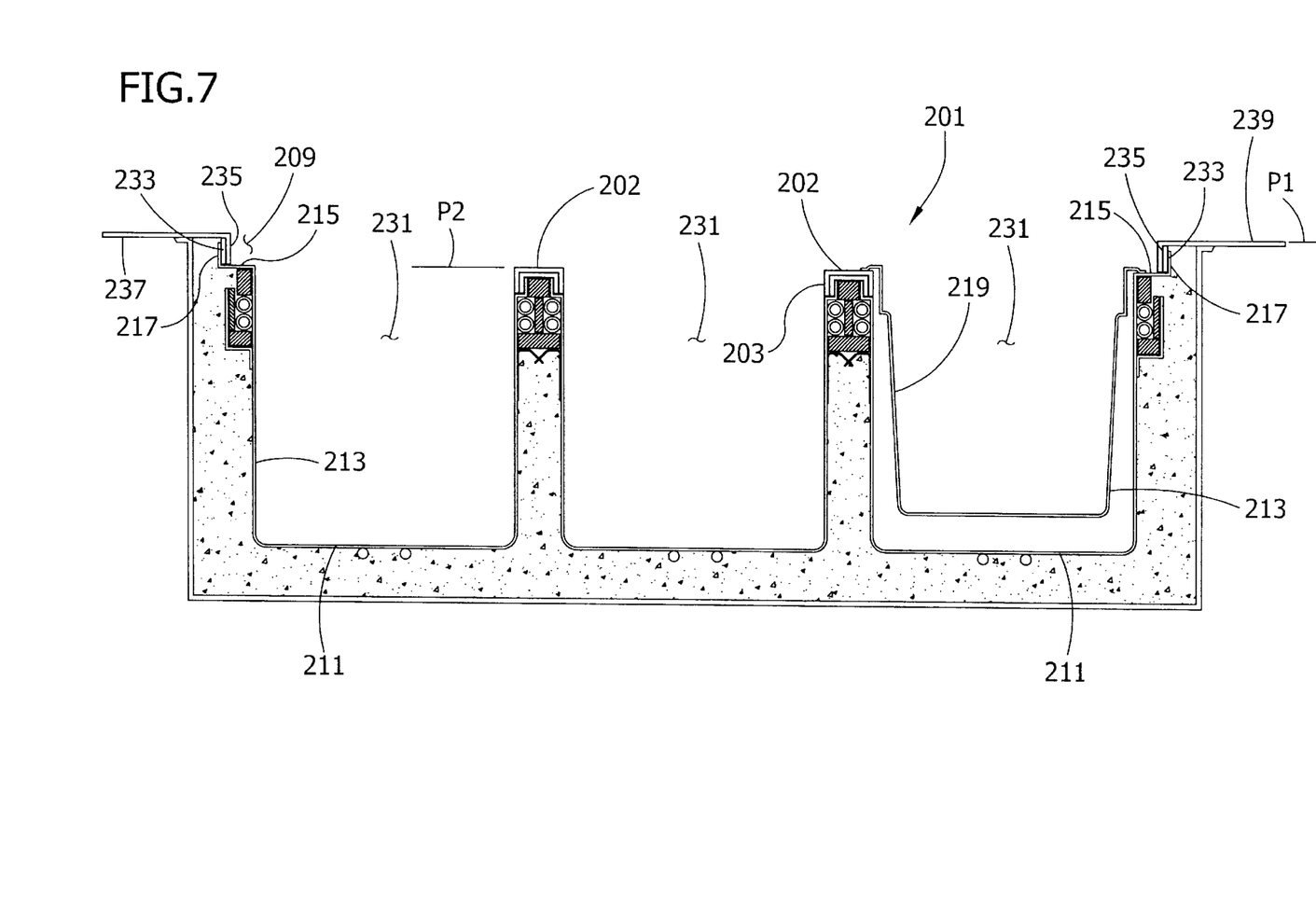
FIG. 7 is a sectional view showing a plurality of dividers and cavities in the food serving bar of FIG. 6, and a food pan in one of the cavities.
Figure 8:
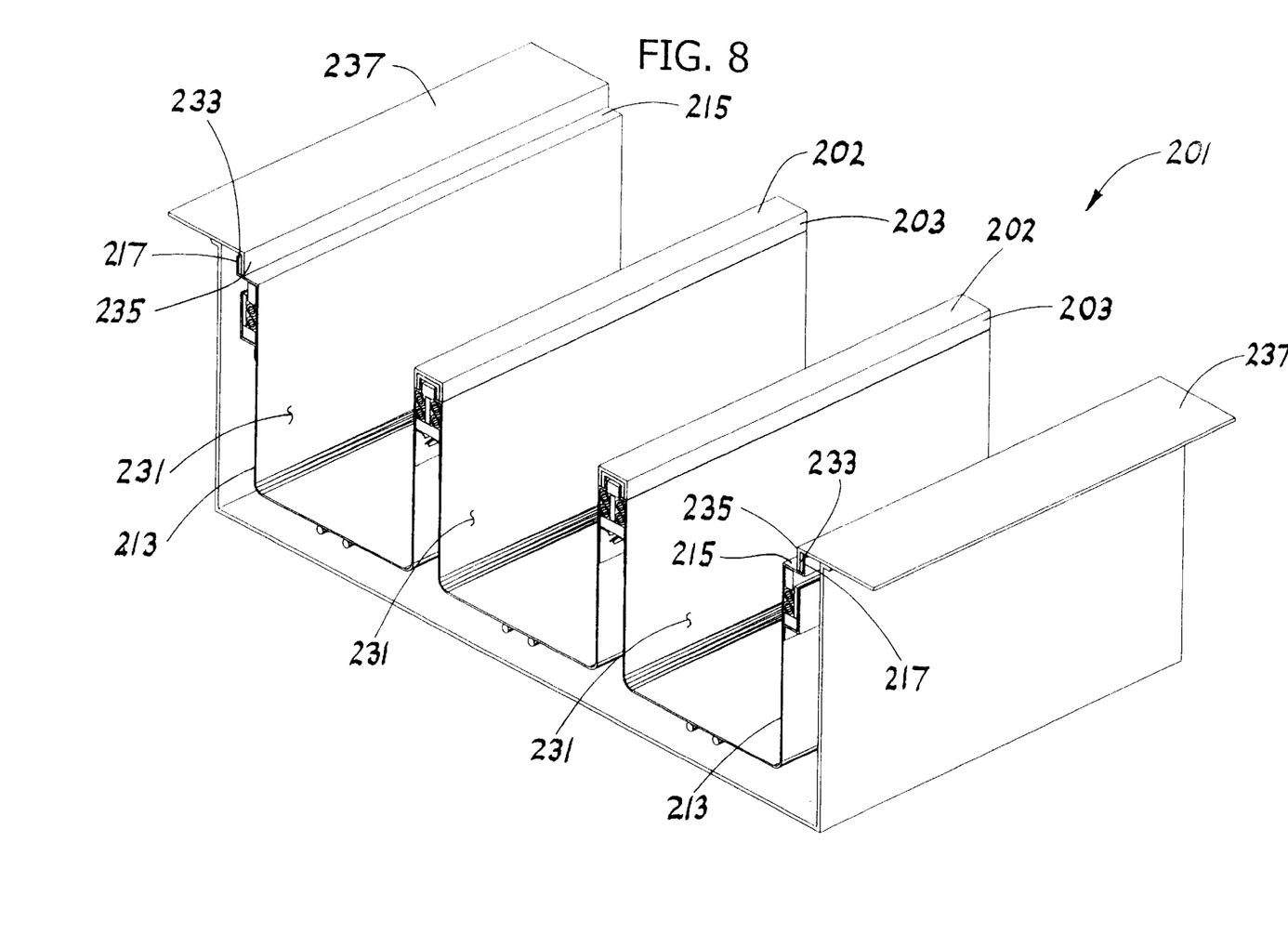
FIG. 8 is a detail cut-away of a portion of the food serving bar of FIG. 6.

FIGS. 6–8 illustrate a second embodiment of a food server of the present invention, generally designated 201. This embodiment is substantially identical to the first embodiment, except that the upward facing surfaces 202 of the pan-supporting caps 203 are disposed in a plane P2 recessed below the plane P1 of the top wall 205 of the cabinet 207. The two outside channels 211 (i.e., the channels adjacent the elongate side edges of the opening 209 in the top wall 205 of the cabinet 207) have outer side walls 213 formed with generally horizontal shoulders 215 and upturned lips 217 at the outer ends of the shoulders. The shoulders 215 are generally coplanar with the upward facing surfaces 202 of the pan-supporting caps 203 to support the pans 219 in the cavities 231 defined by these two channels 211. Thermal barriers 233 are positioned between the upturned lips 217, extending up from the shoulders 215, and the downturned lips 235 of the top wall extensions 237 to prevent frosting of the top wall 205 of the cabinet 207.

Figure 9:
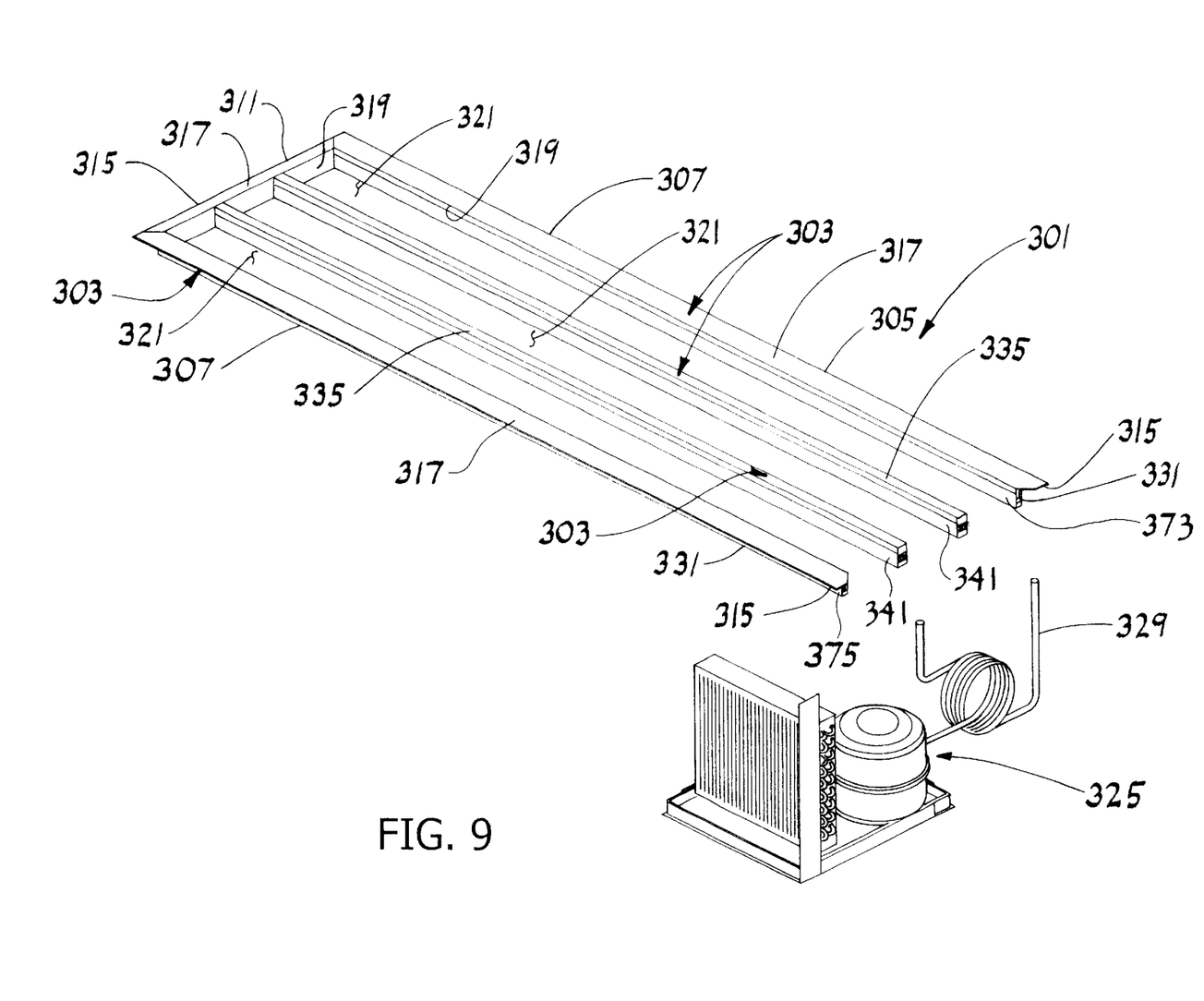
FIG. 9 is a perspective of a third embodiment of a food serving bar of the present invention.
Figure 10:
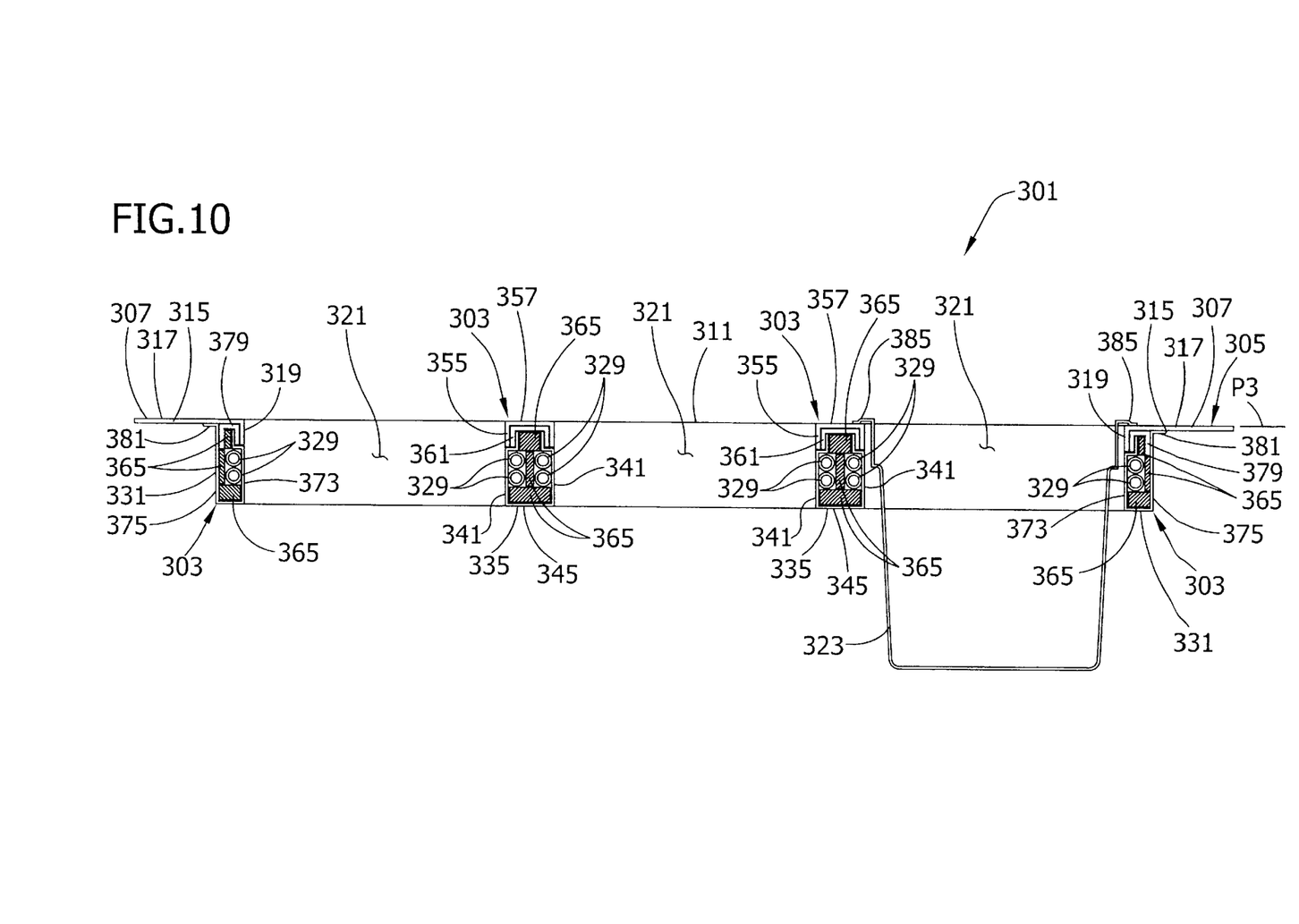
FIG. 10 is a sectional view showing a plurality of dividers and cavities in the food serving bar of FIG. 9, and a food pan in one of the cavities.

FIGS. 9–10 show a third embodiment of a food serving bar, generally designated 301, illustrated as a retrofit to an existing food serving bar such as a frost top unit of the type disclosed in U.S. Pat. No. 4,870,835. It will be understood that this embodiment 301 may also exist as a complete food serving bar incorporating the elements as described below. This design 301 comprises a plurality of dividers 303 supported by a frame 305 that is sized and shaped to fit the opening in the top wall of a food bar. In the embodiment of FIGS. 9–10, the frame 305 is generally rectangular, having a pair of parallel sides 307 and a pair of parallel ends 311, only one of which is shown. It will be understood that the frame 305 could be other shapes (e.g., square or triangular) sized to fit the opening in the top wall of the food bar. Each side 307 and end 311 comprises a horizontal flange 315 adapted to overlie the top wall of the bar and having an upward facing surface 317, and a vertical flange 319 adapted to extend down into the opening in the top wall of the bar. The horizontal flange 315 of support frame 305 may be of a suitable wear resistant material (e.g., stainless steel) to provide a durable design and attractive appearance. As in the previous embodiments, the dividers 303 define a plurality of elongate generally parallel pan receiving cavities 321 for receiving generally parallel rows of food holding pans 323 extending lengthwise of the food bar 301, one such pan being shown in FIG. 10. Also, the bar 301 includes a temperature control system, generally designated 325, and heat transfer lines 329 for cooling or heating dividers 303 and the pans 323 in a similar manner as the previous embodiments.

Referring to FIGS. 9–10, the food serving bar 301 includes four dividers 303. However, as in the previous embodiments, the number of dividers may vary. The spacing between the dividers 303 is preferably substantially the same as the spacing between the dividers 23 of FIG. 1, although this spacing may also vary. The dividers 303 of the food bar 301 are shown in the form of rails, with a pair of side rails 331 extending along opposite parallel sides 307 of the support frame 305, and two spaced-apart center rails 335 extending along the opening between the side rails. The side rails 331 and center rails 335 are secured (e.g., welded) at their front and back ends to the respective vertical flanges 319 of parallel ends 311 of the support frame 305.

Each center rail 335 has opposing side walls 341 (FIG. 10) and a bottom wall 345 defining a space which contains the heat transfer lines 329, in a similar arrangement as the previous embodiments. Each center rail 335 further comprises a stainless steel cap 355 with an upward facing surface 357 and a thermal barrier 361 below the cap bridging the opposing side walls 341 of the rail. The center rails 335 are preferably filled with strips of thermal insulation 365 that surround the heat transfer lines 329 on three sides. As in the previous embodiments, the heat transfer lines 329 are preferably in contact with respective opposing side walls 341 to cool (or heat) the side walls and the food pan 323 located nearby. Also, the caps 355 and opposing side walls 341 of each center rail 335 form a smooth, flat, continuous junction similar to the previous embodiments.

Each side rail 331 has an inner and outer side wall, 373 and 375 respectively, defining a space which contains heat transfer lines 329 and strips of thermal insulation 365 as in the previous embodiments. In the embodiment of FIGS. 9–10, the horizontal flange 315 of the support frame 305 overlies the inner and outer side walls 373, 375. A thermal barrier 379 below the horizontal flange 315 prevents frosting of the frame 305. Vertical flanges 319 of the support frame 305 mate against the thermal barrier 379 to form a smooth, flat, continuous surface with the inner side walls 373. Each outer side wall 375 has a flange 381 that is secured (e.g., welded) to horizontal flange 315. Each horizontal flange is mounted on the existing food server unit top wall (not shown) so that the upward facing surfaces 357 of caps 355 and upward facing surfaces 317 lie substantially in the same plane P3. The caps 355 and horizontal flange 315 of support frame 305 support the peripheral lips 385 of the food-holding pans 323 so that the pan is supported in the cavities 321 between adjacent rails 331, 335.

The specific dimensions of the center rails 335 and side rails 331 (or rail if only one is provided) will vary, depending on cooling or heating requirements. By way of example, each center rail 335 may have an overall height of about 1.7 in., a width (between side walls 341) of about 1.1 in., and a length of about 82 in., and each side rail 331 may have an overall height of about 1.7 in., a width (between inner and outer side walls 373, 375) of about 0.7 in., and a length of about 82 in.

Figure 11:
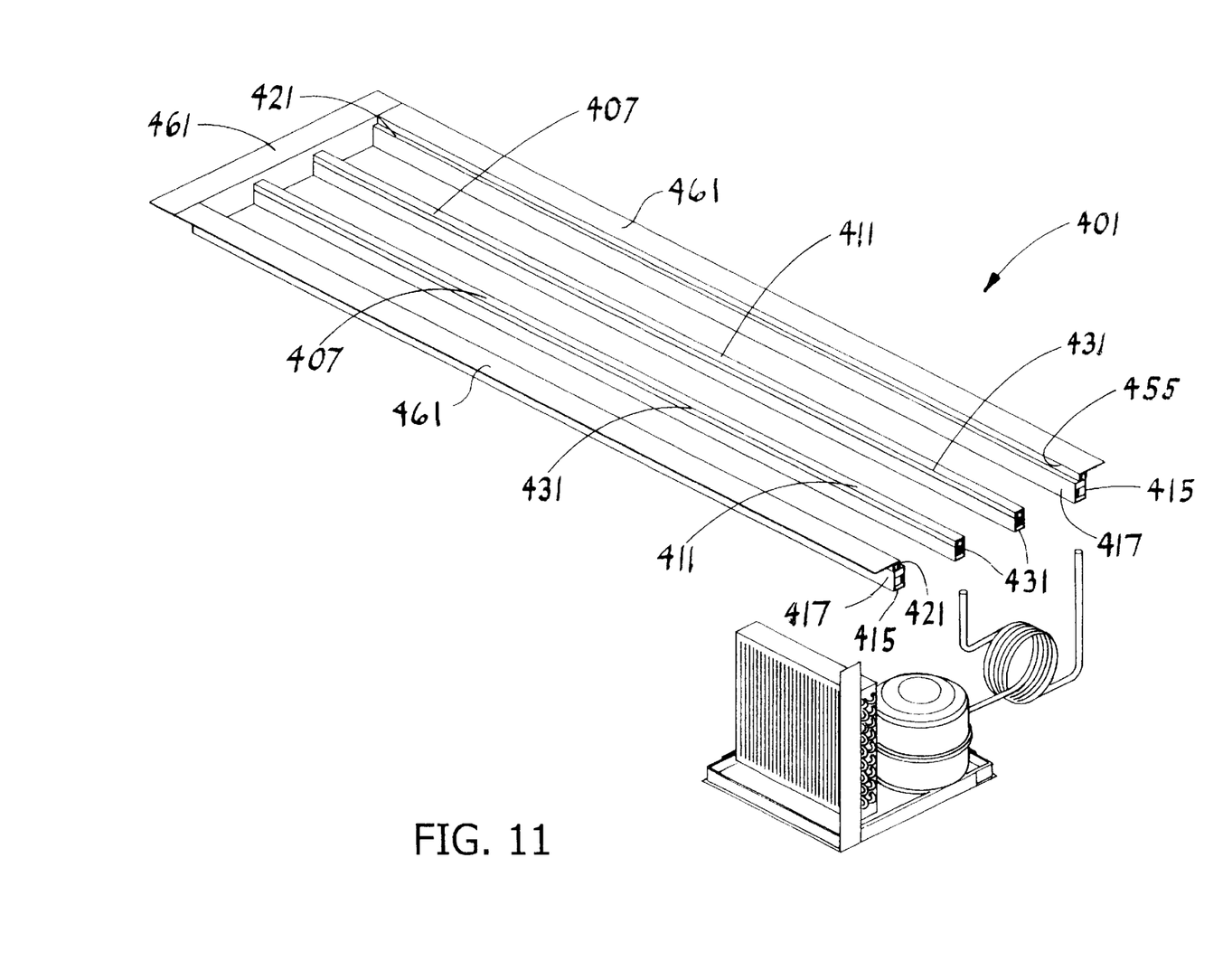
FIG. 11 is a perspective of a fourth embodiment of a food serving bar of the present invention.
Figure 12:
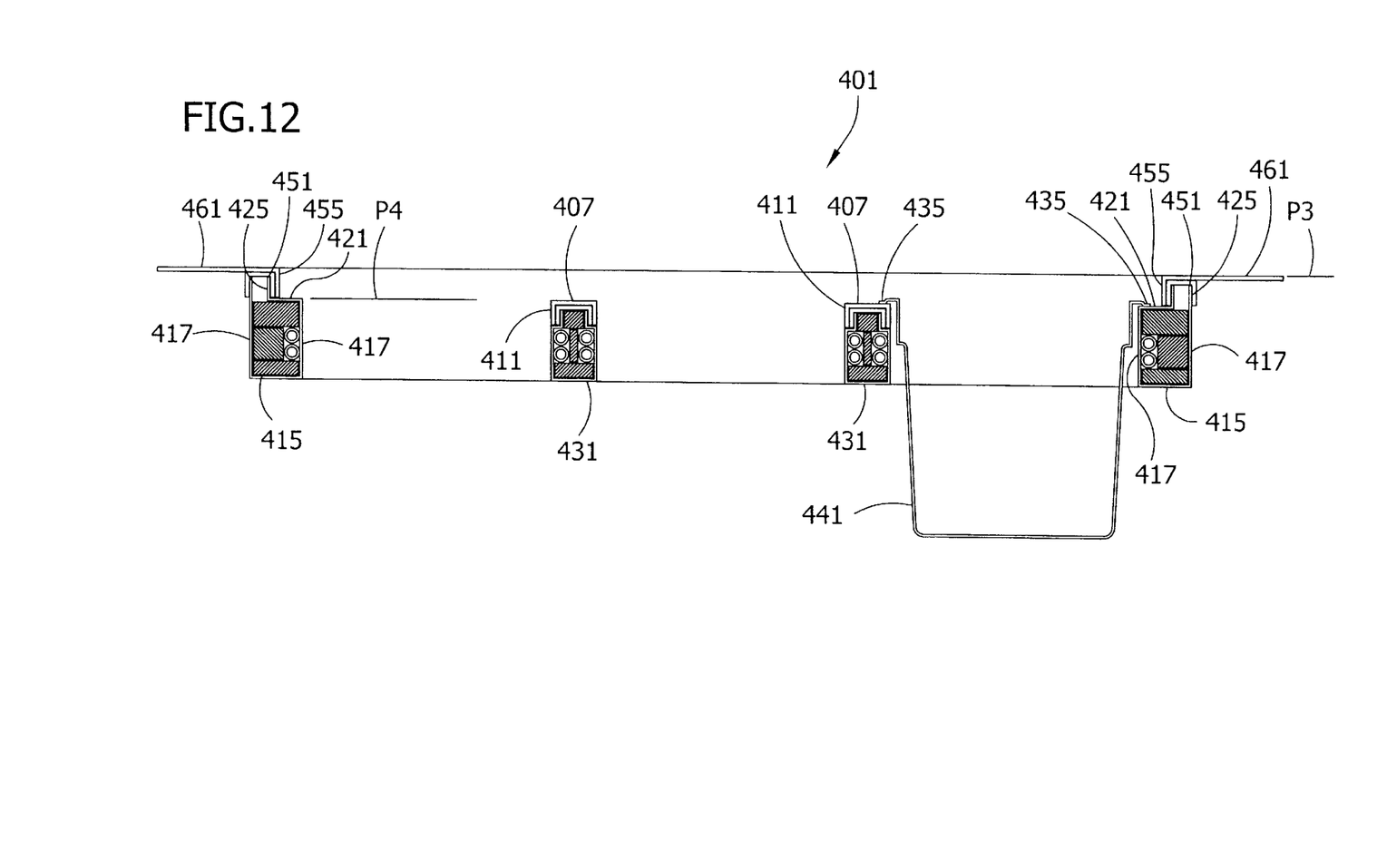
FIG. 12 is a sectional view showing a plurality of dividers and cavities in the food serving bar of FIG. 11, and a food pan in one of the cavities.

FIGS. 11–12 illustrate a fourth embodiment of a food serving bar, generally designated 401. This embodiment is substantially similar to the third embodiment, except that the upward facing surfaces 407 of the pan-supporting caps 411 are disposed in a plane P4 recessed below the plane P3 of the existing top wall of the food serving bar. The two side rails 415 have outer side walls 417 formed with generally horizontal shoulders 421 and upturned lips 425 at the outer ends of the shoulders. The shoulders 421 are generally coplanar with upward facing surfaces 407 of the pan supporting caps 411 of the center rails 431 to support the peripheral lips 435 of the food-holding pans 441.

Thermal barriers 451 are positioned between the upturned lips 425 of the side rails 415 and the vertical flange 455 of the support frame 461 to prevent frosting of the frame that overlies the top wall of the cabinet (not shown).

While the food server of each of the above embodiments is preferably a cold-pan server, it will be understood, as noted earlier, that the technology of the present invention could be used for hot-pan servers. This can be achieved by using heating elements in lieu of refrigeration lines. Such elements could include, for example, heating lines through which a hot thermal fluid is circulated to heat the walls of the dividers. Electric resistance heaters could also be used to heat the dividers. In this configuration, extruded channels or other dividers could be formed to function as heat sinks, similar to the heat sinks described in co-assigned U.S. Pat. Nos. 6,262,394 and 6,175,099, both of which are incorporated herein by reference.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A temperature-controlled food serving bar comprising
a cabinet having a bottom, opposite sides and opposite ends defining an interior space, a top wall, and an opening in the top wall above said interior space,
a plurality of elongate, generally parallel, spaced apart dividers of thermally conductive material extending lengthwise of the cabinet in or below said opening, said dividers having side walls extending down into said interior space dividing said interior space into a plurality of elongate generally parallel cavities extending lengthwise of the cabinet,
a temperature control system comprising a plurality of heat transfer lines extending along the side walls of the dividers at locations outside said cavities for controlling the temperature of the side walls,
upwardly facing surfaces on the dividers for supporting food-holding pans in positions in which the pans extend down into said cavities adjacent the side walls of the dividers for being heated or cooled thereby, and
thermal barriers below said upwardly facing surfaces for inhibiting the transfer of heat between the side walls of the dividers and said surfaces.

2. A serving bar as set forth in claim 1 wherein said dividers comprise at least two channels each having two opposing side walls constituting said side walls of a respective divider and a bottom wall, the side walls and bottom wall of the channel combining to define one of said cavities for receiving multiple food-holding pans therein.

3. A serving bar as set forth in claim 2 wherein said at least two channels are disposed side by side with adjacent side walls of the channels spaced apart to define an inner substantially vertical interior space between the two side walls, and wherein said heat transfer lines include at least two lines in said inner substantially vertical space in heat transfer contact with respective side walls of the channels.

4. A serving bar as set forth in claim 3 further comprising insulation in said inner substantially vertical interior space below said at least two heat transfer lines.

5. A serving bar as set forth in claim 3 further comprising brackets securing said heat transfer lines in contact with respective side walls of the channels.

6. A serving bar as set forth in claim 4 further comprising a liner in said cabinet having sides extending down from said opening spaced away from the side walls of the channels and a bottom spaced below the bottom walls of said channels, said liner and channels substantially defining a generally horizontal interior space between the bottom of the liner and the bottom walls of the channels and outer generally vertical interior spaces between the sides of the liner and respective side walls of the channels.

7. A serving bar as set forth in claim 6 further comprising thermal insulation substantially filling said generally horizontal interior space and said outer generally vertical interior spaces.

8. A serving bar as set forth in claim 7 wherein said thermal barriers overlie said inner and outer generally vertical interior spaces.

9. A serving bar as set forth in claim 8 wherein said upwardly facing surfaces comprise at least one wear resistant cap bridging adjacent side walls of said at least two channels, and wherein at least one of said thermal barriers is disposed below the cap.

10. A serving bar as set forth in claim 2 wherein said upwardly facing surfaces comprise at least one wear resistant cap bridging adjacent side walls of said at least two channels, and wherein at least one of said thermal barriers is disposed below the cap.

11. A serving bar as set forth in claim 2 wherein said upwardly facing surfaces are generally coplanar with said top wall.

12. A serving bar as set forth in claim 2 wherein said upwardly facing surfaces are disposed at an elevation below said top wall.

13. A serving bar as set forth in claim 2 wherein said channels are of extruded metal and function as heat sinks.

14. A serving bar as set forth in claim 1 further comprising a liner below said opening having sides extending down from said top wall and a bottom spaced below said opening in the top wall and below said dividers, said liner dividing said interior space into an upper section inside the liner containing said dividers and a lower section below the liner.

15. A serving bar as set forth in claim 14 wherein said temperature control system also controls the temperature in the lower section of the cabinet.

16. A serving bar as set forth in claim 2 wherein said temperature control system is free of heat transfer lines extending transversely across the channels at locations corresponding to locations between adjacent pans in the cavities.

17. A serving bar as set forth in claim 1 wherein said dividers comprise at least two parallel rails spaced apart to define a cavity therebetween for receiving multiple food-holding pans therein, each rail having spaced apart generally vertical side walls defining an interior space for containing at least two of said heat transfer lines, one of said divider side walls forming a temperature-controlled wall of one of said cavities and the other of said divider side walls forming a temperature-controlled wall of another of said cavities.

18. A serving bar as set forth in claim 17 wherein said upwardly facing surfaces comprise wear resistant caps bridging the side walls of said dividers, and wherein said thermal barriers are disposed below the caps.

19. A serving bar as set forth in claim 17 wherein said at least two heat transfer lines in said interior space are in contact with respective side walls of the divider, and wherein said interior space around said heat transfer lines is substantially filled with thermal insulation.

20. A serving bar as set forth in claim 17 wherein said at least two rails constitute center rails extending along said elongate opening in the top wall of the cabinet at locations spaced from opposite elongate sides of the cabinet, and wherein said dividers also include a pair of side rails extending along said elongate opening at opposite sides of the opening, each said rail having a side wall opposing the side wall of an adjacent center rail to define one of said cavities therebetween.

21. A serving bar as set forth in claim 17 wherein said side rails are supported by a flange mounted on the top wall of the cabinet.

22. A serving bar as set forth in claim 17 wherein said upwardly facing surfaces are disposed at an elevation below said top wall.

23. A serving bar as set forth in claim 1 wherein said heat transfer lines include at least two lines disposed one above the other extending along each side wall of the dividers.

24. A temperature-controlled food serving bar comprising
    a cabinet having a bottom, opposite sides and opposite ends defining an interior space, a top wall and an opening in the top wall above said interior space,
    at least two generally parallel, spaced apart channels of thermally conductive material extending lengthwise of the cabinet in or below said opening, each channel having a bottom wall and opposing side walls defining an elongate cavity extending lengthwise of the cabinet,
    a temperature control system comprising a plurality of heat transfer lines extending along the side walls of the channels at locations outside said cavities, and
    upwardly facing surfaces on the channels for supporting food-holding pans in positions in which the pans extend down into said cavities adjacent the side walls of the channels for being heated or cooled thereby.

25. A serving bar as set forth in claim 24 wherein said upwardly facing surfaces comprise at least one wear resistant cap bridging adjacent side walls of said at least two channels.

26. A serving bar as set forth in claim 24 wherein said at least two channels are disposed side by side with adjacent side walls of the channels spaced apart to define an inner substantially vertical interior space between the two side walls, and wherein said heat transfer lines include at least two lines in said inner substantially vertical space in heat transfer contact with respective side walls of the channels.

27. A serving bar as set forth in claim 26 further comprising insulation in said inner substantially vertical interior space below said at least two heat transfer lines.

28. A serving bar as set forth in claim 26 further comprising brackets securing said heat transfer lines in contact with respective side walls of the channels.

29. A serving bar as set forth in claim 27 further comprising a liner in said cabinet having sides extending down from said opening spaced away from the side walls of the channels and a bottom spaced below the bottom walls of said channels, said liner and channels substantially defining a generally horizontal interior space between the bottom of the liner and the bottom walls of the channels and outer generally vertical interior spaces between the sides of the liner and respective side walls of the channels.

30. A serving bar as set forth in claim 29 further comprising thermal insulation substantially filling said generally horizontal interior space and said outer generally vertical interior spaces.

31. A serving bar as set forth in claim 24 wherein said upwardly facing surfaces are generally coplanar with said top wall.

32. A serving bar as set forth in claim 24 wherein said upwardly facing surfaces are disposed at an elevation below said top wall.

33. A serving bar as set forth in claim 24 wherein said channels are of extruded metal and function as heat sinks.

34. A serving bar as set forth in claim 24 further comprising a liner below said opening having sides extending down from said top wall and a bottom spaced below said opening in the top wall and below said dividers, said liner dividing said interior space into an upper section inside the liner containing said dividers and a lower section below the liner.

35. A serving bar as set forth in claim 34 wherein said temperature control system is operable to control the temperature of the lower section of the cabinet.

36. A serving bar as set forth in claim 24 wherein said refrigeration system is free of heat transfer lines extending transversely across the channels at locations corresponding to locations between adjacent pans in the channels.

37. A serving bar as set forth in claim 1 wherein said heat transfer lines form separate heat transfer coils for controlling the temperature of each respective cavity.

38. A serving bar as set forth in claim 24 wherein said heat transfer lines form separate heat transfer coils for controlling the temperature of each respective cavity.

39. A serving bar as set forth in claim 1 wherein said thermal barrier comprise heat insulating material.

40. A serving bar as set forth in claim 1 wherein each elongate cavity is undivided along an entire length of the cavity.

41. A serving bar as set forth in claim 24 wherein each elongate cavity is undivided along an entire length of the cavity.

42. A temperature-controlled food serving bar comprising
    a cabinet having a bottom, opposite sides and opposite ends defining an interior space, a top wall, and an opening in the top wall above said interior space,
    a plurality of elongate, generally parallel, spaced apart dividers of thermally conductive material extending lengthwise of the cabinet in or below said opening, said dividers having side walls extending down into said interior space dividing said interior space into a plurality of elongate generally parallel cavities extending lengthwise of the cabinet,
    a temperature control system comprising a plurality of heat transfer lines extending along the side walls of the dividers at locations outside said cavities for controlling the temperature of the side walls,
    upwardly facing surfaces on the dividers for supporting food-holding pans in positions in which the pans extend down into said cavities adjacent the side walls of the dividers for being heated or cooled thereby,
    thermal barriers below said upwardly facing surfaces for inhibiting the transfer of heat between the side walls of the dividers and said surfaces, and
    a liner below said opening having sides extending down from said top wall and a bottom spaced below said opening in the top wall and below said dividers, said liner dividing said interior space into an upper section inside the liner containing said dividers and a lower section below the liner.

43. A temperature-controlled food serving bar comprising a cabinet having a bottom, opposite sides and opposite ends defining an interior space, a top wall, and an opening in the top wall above said interior space, a plurality of elongate, generally parallel, spaced apart dividers of thermally conductive material extending lengthwise of the cabinet in or below said opening, said dividers having side walls extending down into said interior space dividing said interior space into a plurality of elongate generally parallel cavities extending lengthwise of the cabinet, a temperature control system comprising at least two heat transfer lines disposed one above the other and extending along the side walls of the dividers at locations outside said cavities for controlling the temperature of the side walls, upwardly facing surfaces on the dividers for supporting food-holding pans in positions in which the pans extend down into said cavities adjacent the side walls of the dividers for being heated or cooled thereby, and thermal barriers below said upwardly facing surfaces for inhibiting the transfer of heat between the side walls of the dividers and said surfaces.

44. A temperature-controlled food serving bar comprising a cabinet having a bottom, opposite sides and opposite ends defining an interior cabinet space, a top wall, and an elongate opening in the top wall above said interior cabinet space, at least one divider of thermally conductive material extending the length of the elongate cabinet opening and dividing the interior cabinet space into a plurality of elongate, pan-receiving cavities each of which opens upwardly along the entire length of the cavity to allow placement of multiple food-holding pans in the cavity at any desired location along the cavity, said at least one divider having generally parallel, closely spaced divider side walls defining a narrow, elongate interior divider space between the divider side walls, a plurality of food-holding pans received in each pan-receiving cavity, and a temperature control system comprising a plurality of heat transfer lines in said interior divider space for controlling the temperature of the divider side walls to cool said food-holding pans in said cavities.

45. A serving bar as set forth in claim 44 wherein each pan-receiving cavity is undivided along an entire length of the cavity.

* * * * *

UNITED STATES PATENT AND TRADEMARK OFFICE
CERTIFICATE OF CORRECTION

PATENT NO. : 6,735,971 B2
DATED : May 18, 2004
INVENTOR(S) : Daryl R. Monroe et al.

It is certified that error appears in the above-identified patent and that said Letters Patent is hereby corrected as shown below:

Title page,
Item [75], Inventors, should read:
-- Daryl R. Monroe, Granite City, IL,
Kim C. Fietsam, New Athens, IL
Paul S. Rusk, Ballwin, MO
Thomas E. Yingst, St. Louis, MO
Albert D. Smith, Sedalia, MO --.

Signed and Sealed this

Twenty-fifth Day of January, 2005

JON W. DUDAS
*Director of the United States Patent and Trademark Office*